C. SCHOUTE, F. A. VAN HEYST AND N. E. G. MEYER.
APPARATUS FOR DETERMINING THE POSITION OR THE MOVEMENT OF A BODY OR FOR CONTROLLING THE AUXILIARY DEVICES DEPENDENT ON SAID POSITION OR MOVEMENT.
APPLICATION FILED MAR. 15, 1919.

1,336,399.

Patented Apr. 6, 1920.

Inventors
C. Schoute.
F. A. van Heyst.
N. E. Groeneveld Meyer.
By H. R. Kerslake
Atty.

UNITED STATES PATENT OFFICE.

CORNELIS SCHOUTE, OF DE BILT, NEAR UTRECHT, FLORIS ALBERT VAN HEYST, OF SOESTERBERG, AND NICOLAAS EVERHARD GROENEVELD MEYER, OF BOSCH EN DUIN, NEAR ZEIST, NETHERLANDS.

APPARATUS FOR DETERMINING THE POSITION OR THE MOVEMENT OF A BODY OR FOR CONTROLLING THE AUXILIARY DEVICES DEPENDENT ON SAID POSITION OR MOVEMENT.

1,336,399.          Specification of Letters Patent.          Patented Apr. 6, 1920.

Application filed March 15, 1919. Serial No. 282,915.

*To all whom it may concern:*

Be it known that we, CORNELIS SCHOUTE, FLORIS ALBERT VAN HEYST, and NICOLAAS EVERHARD GROENEVELD MEYER, subjects of the Queen of the Netherlands, and residing at de Bilt, near Utrecht, the Netherlands, Soesterberg, the Netherlands, Bosch en Duin, near Zeist, the Netherlands, respectively, have invented certain new and useful Improvements in Apparatus for determining the position or the movement of a body or for controlling the auxiliary devices dependent on said position or movement, of which the following is a specification.

The invention relates to electric apparatus for determining the position or movement of a body or for controlling auxiliary devices dependent on said position or movement.

This invention is based in principle on the inter-action of a coil rotating in a magnetic field, and the magnetic field itself when the inclination of the axis of rotation to the direction of the field is varied.

The improved apparatus of the invention comprises an electro-dynamic device constituted by a rotating coil and a magnetic field arranged in the manner above described and operates as an electric generator the position of the axis of rotation of the coil and, in some cases its speed of rotation, being arranged to be dependent on the static and dynamic conditions of the body the position or movement of which is to be indicated, and the coil is connected with an electrically operated indicating device.

Figure 1:
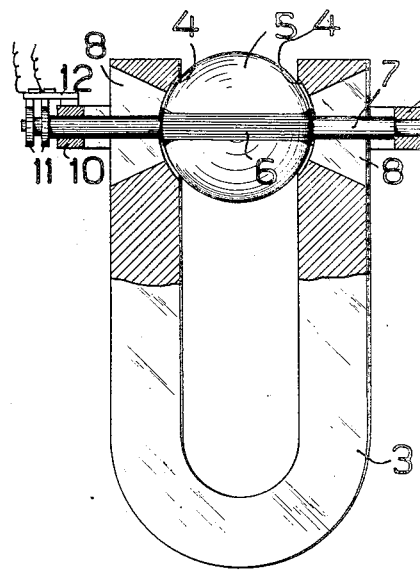
Figure 2:
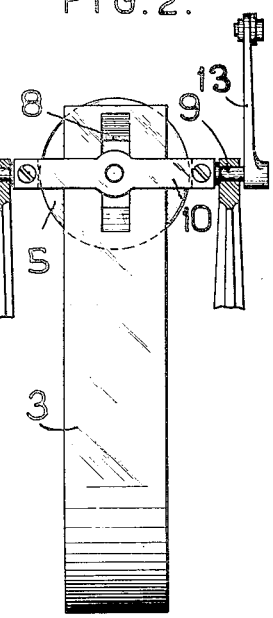

The invention will be more fully understood by reference to the accompanying drawings in which:

Figure 1 is a side view partly in longitudinal section of a generator device embodying the invention;

Fig. 2 a front view of the same device partly in cross section.

Referring now to the drawings, a spherical armature 5 is shown as provided with a coil 6 and rotates between the poles of a horse-shoe magnet 3. The coil 6 forms the most important element of the device and its position in the magnetic field under normal conditions of the axis of rotation is an unusual one with generators and motors, the shaft 7 of the armature 5 which determines the axis of rotation of the coil 6 being normally situated parallel to the direction of the magnetic field. Under these conditions provided the field is symmetrical, no electromotive force will be induced in the coil 6. The device is however so constructed that the shaft 7 can be inclined at any desired angle (within certain limits) to the direction of the magnetic field.

For this purpose the magnetic poles 4 are provided with slots 8 and the armature 5 is mounted in a ring 10 adapted to oscillate about pivots 9. The supply of electric current from the coil 6 is effected by means of slip rings 11 and brush gear 12, the connection of the slip rings 11 to the terminals of the coil 6 being effected by conductors located in the shaft 7, which is tubular for this purpose.

The inclination of the shaft 7 and therefore of the coil 6 relative to the direction of the magnetic field is caused by relative rotation about the pivots 9. It is obvious that to produce such relative rotation either the ring 10 or the magnet 3 may be moved from the normal position shown in Figs. 1 and 2.

Secured to one of the pivots 9 is a lever 13 or its equivalent, for the purpose of controlling the relative angular position of the shaft 7 in the magnetic field in accordance with the controlling conditions.

In the case of a constant and homogeneous magnetic field with a single armature coil, the electromotive force generated in the coil 6 will be proportional to the sine of the angle between the shaft 7 and the horizontal plane if the shaft be moved from the horizontal into the vertical position, provided the rotary speed of the armature remains constant. In general there will be no exact sine relation between the electromotive force and the angle between the shaft 7 and the horizontal plane. The electromotive force generated will, however, follow a law found by means of experiments or by calculation for each case in particular.

For the sake of convenience the magnetic field will be kept as constant as possible—apart from the reaction of the coil—and for this reason the permanent magnet 3 is used in the present embodiment.

The coil 6 and the axis of rotation need not be in the same plane provided they are not perpendicular to one another. The position of the coil can be chosen such as to produce the greatest variation in the electromotive force resulting from the movements of the shaft 7, and therefore the most effective action and great sensitiveness.

By connecting the device with an electric recording or indicating device, the position of the coil and the shaft 7 can be determined from the electromotive force induced at constant speed of rotation of this shaft. In case the speed of rotation is not constant, the combined speed and position of the shaft 7 are indicated. By causing the speed and position to be directly or indirectly dependent in any suitable manner on the dynamic and static conditions to be measured, the latter can be indicated on the indicating device according to a law characteristic of the device.

Thus it will be possible e. g. to determine the position of a drill-rod at a great depth in the ground as regards the deviation of the axis of the rod from the vertical, if the position of the axis of the armature is made dependent on the position of the rod and the armature itself is rotated at a constant speed.

Having now particularly described and ascertained the nature of our said invention and in what manner the same is to be performed, we declare that what we claim is:—

1. Apparatus for determining the position or movement of a body or for controlling auxiliary devices dependent on said position or movement comprising a dynamo-electric device provided with means for establishing a magnetic field, and a relatively rotatable armature the axis of which is adapted to be adjustably inclined to the direction of the magnetic field of the device.

2. Apparatus for determining the position or movement of a body or for controlling auxiliary devices dependent upon such position or movement comprising a dynamo-electric device provided with a permanent magnet and a relatively rotatable armature the axis of which is arranged to be adjustably inclined to the direction of the field of the magnet.

In testimony whereof we affix our signatures.

CORNELIS SCHOUTE.
FLORIS ALBERT van HEYST.
NICOLAAS EVERHARD GROENEVELD MEYER.